(12) United States Patent
Dalla-Torre et al.

(10) Patent No.: US 9,851,714 B2
(45) Date of Patent: Dec. 26, 2017

(54) METHOD OF INSPECTING A SPECIMEN AND SYSTEM THEREOF

(71) Applicant: Applied Materials Israel Ltd., Rehovot (IL)

(72) Inventors: Michele Dalla-Torre, Givataim (IL); Amit Batikoff, Petach Tikva (IL); Efrat Rozenman, Aseret (IL); Ron Katzir, Tel Aviv (IL); Imry Kissos, Kiryat-Ono (IL)

(73) Assignee: APPLIED MATERIALS ISRAEL, LTD., Rehovot (IL)

( * ) Notice: Subject to any disclaimer, the term of this patent is extended or adjusted under 35 U.S.C. 154(b) by 0 days.

(21) Appl. No.: 14/728,495

(22) Filed: Jun. 2, 2015

(65) Prior Publication Data

US 2016/0350905 A1  Dec. 1, 2016

Related U.S. Application Data

(62) Division of application No. 14/727,800, filed on Jun. 1, 2015.

(51) Int. Cl.
  *G06K 9/00* (2006.01)
  *G05B 19/418* (2006.01)
  *G06K 9/62* (2006.01)
  *G06T 7/00* (2017.01)

(52) U.S. Cl.
  CPC ..... *G05B 19/41875* (2013.01); *G06K 9/6202* (2013.01); *G06T 7/001* (2013.01); *G06T 7/0004* (2013.01); *G05B 2219/37224* (2013.01); *G05B 2219/45031* (2013.01); *G06T 2200/24* (2013.01); *G06T 2207/30148* (2013.01); *Y02P 90/265* (2015.11)

(58) Field of Classification Search
None
See application file for complete search history.

(56) References Cited

U.S. PATENT DOCUMENTS

| 7,684,609 B1 | 3/2010 | Toth et al. |
| 2006/0108524 A1 | 5/2006 | Nagatomo et al. |
| 2006/0110042 A1 | 5/2006 | Onishi et al. |
| 2007/0280527 A1 | 12/2007 | Almogy et al. |

(Continued)

*Primary Examiner* — Hadi Akhavannik
(74) *Attorney, Agent, or Firm* — Lowenstein Sandler LLP (57) ABSTRACT

There are provided a method of inspecting the inspection area and an inspection system thereof. The inspection system comprises an inspection control unit operatively coupled to an inspection tool unit and to a recipe generating unit. The inspection control unit is configured to obtain the design data and the inspection recipe; to provide local segmentation of at least one inspection PoI comprised in an inspection image captured from the inspection area by the inspection tool unit, thereby obtaining inspection structural elements comprised in the at least one inspection PoI, the local segmentation is provided using segmentation configuration data specified in the inspection recipe; to identify one or more target structural elements and design structural elements corresponding thereto, identifying is provided using design association data specified in the inspection recipe; and to enable metrology measurements for the one or more target structural elements using the identified design structural elements.

16 Claims, 4 Drawing Sheets

(56) References Cited

U.S. PATENT DOCUMENTS

| | | | |
|---|---|---|---|
| 2007/0288219 A1* | 12/2007 | Zafar | G03F 1/84 703/14 |
| 2008/0073533 A1* | 3/2008 | Makino | G03F 7/70616 250/310 |
| 2008/0279444 A1* | 11/2008 | Fischer | G03F 1/84 382/145 |
| 2009/0238443 A1 | 9/2009 | Sato et al. | |
| 2009/0266985 A1 | 10/2009 | Nakahira et al. | |
| 2010/0265496 A1* | 10/2010 | Nakano | G01N 21/94 356/237.5 |
| 2012/0212601 A1 | 8/2012 | Fang et al. | |
| 2013/0066454 A1* | 3/2013 | Geshel | G05B 19/41865 700/97 |
| 2013/0202187 A1 | 8/2013 | Goren et al. | |
| 2013/0204569 A1 | 8/2013 | Goren et al. | |
| 2016/0150191 A1* | 5/2016 | Karsenti | H04N 7/181 382/149 |

* cited by examiner

METHOD OF INSPECTING A SPECIMEN AND SYSTEM THEREOF

CROSS-REFERENCE TO RELATED APPLICATIONS

This application is a divisional of U.S. Nonprovisional application Ser. No. 14/727,800, filed Jun. 1, 2015, entitled "METHOD OF INSPECTING A SPECIMEN AND SYSTEM THEREOF," which is incorporated herein by reference for all purposes.

TECHNICAL FIELD

The presently disclosed subject matter relates, in general, to the field of inspection of a specimen, and more specifically, to methods and systems for automating of a specimen's inspection.

BACKGROUND OF THE INVENTION

In the semiconductor industry, devices are fabricated by a number of manufacturing processes, producing structures of an ever-decreasing size. Current demands for high density and performance associated with ultra large scale integration require formation of device features with high precision and uniformity, which in turn necessitate automated process monitoring, including frequent and detailed inspection of specimens during the manufacturing process.

The term "specimen" used in this specification should be expansively construed to cover any kind of wafer, reticle and other structures, combinations and/or parts thereof used for manufacturing semiconductor integrated circuits, magnetic heads, flat panel displays, and other micro-fabricated devices.

The term "inspection" used in this specification should be expansively construed to cover any kind of detection and/or classification of defects in a specimen provided by using non-destructive inspection tools. By way of non-limiting example, the inspection process can include generating an inspection recipe and/or runtime scanning (in a single or in multiple scans), reviewing, measuring and/or other operations provided with regard to the specimen or parts thereof using the same or different inspection tools. Note that, unless specifically stated otherwise, the term "inspection" or its derivatives used in this specification are not limited with respect to resolution or size of inspection area.

A variety of non-destructive inspection tools includes, by way of non-limiting example, scanning electron microscopes, atomic force microscopes, optical inspection tools, etc.

By way of non-limiting example, inspection can employ a two phase "scanning and review" procedure. During the first phase, the surface of a specimen is inspected at high-speed and relatively low-resolution. In the first phase a defect map is produced to show suspected locations on the specimen having high probability of a defect. During the second phase the suspected locations are more thoroughly analyzed. In some cases both phases can be implemented by the same inspection tool, and in some other cases these two phases are implemented by different inspection tools.

Inspection processes are used at various steps during a semiconductor manufacturing process to detect defects on specimens. Effectiveness of inspection can be increased by using design-related information. For example, one of the known approaches is using design-related information to specify hotspots where, in view of design considerations, defects may occur at a higher probability and further inspecting defects related to the hotspots.

Problems of using design-related information in inspection processes have been recognized in the conventional art and various techniques have been developed to provide solutions. For example:

US Patent Application No. 2006/0110042 discloses a pattern matching method including: detecting an edge of a pattern in a pattern image obtained by imaging the pattern; segmenting the detected pattern edge to generate a first segment set consisting of first segments; segmenting a pattern edge on reference data which serves as a reference for evaluating the pattern to generate a second segment set consisting of second segments; combining any of the segments in the first segment set with any of the segments in the second segment set to define a segment pair consisting of first and second segments; calculating the compatibility coefficient between every two segment pairs in the defined segment pairs; defining new segment pairs by narrowing down the defined segment pairs by calculating local consistencies of the defined segment pairs on the basis of the calculated compatibility coefficients and by excluding segment pairs having lower local consistencies; determining an optimum segment pair by repeating the calculating the compatibility coefficient and the defining new segment pairs by narrowing down the segment pairs; calculating a feature quantity of a shift vector that links the first and second segments making up the optimum segment pair; and performing position matching between the pattern image and the reference data on the basis of the calculated feature quantity of the shift vector.

US Patent Application No. US2006/0108524 discloses a dimension measuring SEM system and a circuit pattern evaluating system. Design data and measured data on an image of a resist pattern formed by photolithography are superposed for the minute evaluation of differences between a design pattern defined by the design data and the image of the resist pattern, and one- or two-dimensional geometrical features representing differences between the design pattern and the resist pattern are calculated. In some cases, the shape of the resist pattern differs greatly from the design pattern due to OPE effect (optical proximity effect). To superpose the design data and the measured data on the resist pattern stably and accurately, an exposure simulator calculates a simulated pattern on the basis of photomask data on a photomask for an exposure process and exposure conditions and superposes the simulated pattern and the image of the resist pattern.

US Patent Application No. 2007/0280527 discloses a technique wherein images of areas of a wafer are generated and registered with respect to computer aided design (CAD) data to provide registered images. Defects in the wafer are then detected by comparing the registered images to one another and defect location information is generated in CAD coordinates.

US Patent Application No. 2009/0238443 discloses a method and equipment for performing matching by selectively using some of multiple patterns provided in a predetermined region of design data, and equipment for implementing the method. First matching by using multiple patterns can be provided in a predetermined region of design data and thereafter second matching can be performed by using some of the multiple patterns provided in the predetermined region.

US Patent Application No. 2009/0266985 discloses a technique wherein design data and sample characteristic information corresponding to individual areas on the design data are used to perform an image quality improvement operation to make appropriate improvements on image quality according to sample characteristic corresponding to the individual areas on the image, allowing a high speed area division on the image. Further, the use of a database that stores image information associated with the design data allows for an image quality improvement operation that automatically emphasizes portions of the image that greatly differ from past images of the similar design data.

US Patent Application No. 2012/0212601 discloses a method for measuring critical dimension (CD) including: scanning at least one area of interest of a die to obtain at least one scanned image; aligning the scanned image to at least one designed layout pattern to identify a plurality of borders within the scanned image; and averaging distances each measured from the border or the plurality of borders of a pattern associated with a specific type of CD corresponding to the designed layout pattern to obtain a value of CD of the die. The value of critical dimensions of dies can be obtained from the scanned image with lower resolution which is obtained by relatively higher scanning speed, so the above-mentioned method can obtain value of CD for every die within entire wafer to monitor the uniformity of the semi-conductor manufacturing process within an acceptable inspection time.

US Patent Application No. 2013/204569 discloses a system for generating calibration information usable for wafer inspection, the system including: (I) a displacement analysis module, configured to: (a) calculate a displacement for each target out of multiple targets selected in multiple scanned frames which are included in a scanned area of the wafer, the calculating based on a correlation of: (i) an image associated with the respective target which was obtained during a scanning of the wafer, and (ii) design data corresponding to the image; and (b) determining a displacement for each of the multiple scanned frames, the determining based on the displacements calculated for multiple targets in the respective scanned frame; and (II) a subsequent processing module, configured to generate calibration information including the displacements determined for the multiple scanned frames, and a target database that includes target image and location information of each target of a group of database targets.

US Patent Application 2013/202187 discloses a system for location based wafer analysis, the system comprising: a first input interface configured to obtain: (a) calibration information that includes displacements of multiple frames included in a wafer area of a reference wafer, and (b) a target database that includes a target image and location information for each out of multiple targets in each of the multiple frames; a second input interface, configured to obtain scanning image data of a scan of an inspected area of an inspected wafer; a correlator, configured to: (a) define for each out of multiple targets of the database a search window, based on the displacement of the frame in which the target is included; (b) calculate for each out of multiple targets a run-time displacement, based on a correlation of the target image of the target to at least a portion of an area of the scanned image which is defined by the corresponding search window; and (c) determine a frame run-time displacement for each of multiple run-time frames scanned, based on the target run-time displacements determined for multiple targets in the respective run-time frame; and a processor, configured to generate inspection results for the inspected wafer, with the help of at least one of the frame run-time displacements.

U.S. Pat. No. 7,684,609 discloses several embodiments of a method for reviewing a potential defect on a substrate. In one of the embodiments the method includes obtaining an electron-beam image of a relatively large field of view containing a first image segment. The first image segment is substantially smaller than the field of view and includes a location of the potential defect. A comparison image segment within the field of view is determined. The comparison image segment is transformably identical to the first image segment.

GENERAL DESCRIPTION

In accordance with certain aspects of the presently disclosed subject matter there is provided a computerized method of generating an inspection recipe usable for inspecting an inspection area of a specimen, the inspection area comprising at least one pattern of interest (PoI). The method comprises: upon obtaining design data informative of design structural elements comprised in a design PoI corresponding to the at least one PoI, providing global segmentation of a test image captured from the inspection area and comprising at least one test PoI of substantially the same design as the at least one PoI, thereby obtaining segmented structural elements comprised in the test PoI and segmentation configuration data; and associating the segmented structural elements comprised in the test PoI with the design structural elements comprised in the design PoI, thereby obtaining design association data. The method further comprises generating an inspection recipe comprising, at least: segmentation configuration data configured to be used for local segmentation of at least one inspection PoI in an inspection image to be captured from the inspection area, the local segmentation to yield inspection structural elements; and design association data configured to be used for associating at least part of the inspection structural elements with the design structural elements.

In accordance with further aspects of the presently disclosed subject matter, the method can further comprise: prior to associating the segmented structural elements with the design structural elements, registering the test image in design data coordinates and obtaining position calibration data, wherein the generated inspection recipe comprises the position calibration data configured to be used for registering in design data coordinates the inspection image to be captured from the inspection area.

Associating the segmented structural elements with the design structural elements can comprise: assigning to each design structural element a unique identifier; using design data coordinates of the test PoI to identify design structural elements corresponding to segmented structural elements; and for each of the segmented structural elements, assigning to a given segmented structural element and pixels thereof the same unique identifier as of corresponding design structural element.

In accordance with further aspects of the presently disclosed subject matter, design association data can comprise an association data structure associating, for each of the segmented structural elements, each of the pixels corresponding to a given segmented structural element in the test PoI with unique identifier of a design structural element associated with the given segmented structural element.

In accordance with further aspects of the presently disclosed subject matter, the test image can comprise a plurality of test PoIs with substantially the same design. The method can further comprise: for each of segmented structural elements comprised in all PoIs of the plurality of PoIs, associating a given segmented structural element with respective design structural element comprised in the design PoI, thereby obtaining design association data informative of association of each of the pixels corresponding to the segmented structural elements in the plurality of test PoIs with IDs of respectively associated design structural elements.

In accordance with further aspects of the presently disclosed subject matter, the generated inspection recipe further comprises metrology data informative of at least one metrology target, and wherein the design association data are further configured to be used for one or more metrology measurements for one or more inspection structural elements corresponding to the at least one metrology target.

In accordance with other aspects of the presently disclosed subject matter, there is provided a computerized method of inspecting an inspection area of a specimen, the inspection area comprising at least one inspection pattern of interest (PoI). The method comprises: upon obtaining design data informative of design structural elements comprised in a design PoI corresponding to the PoI and an inspection recipe generated using the design data and a test image comprising at least one test PoI of substantially the same design as the at least one PoI, providing local segmentation of at least one inspection PoI comprised in an inspection image captured from the inspection area, thereby obtaining inspection structural elements comprised in the at least one inspection PoI, wherein the local segmentation is provided using segmentation configuration data specified in the inspection recipe and obtained resulting of global segmentation of the test image captured from the inspection area. The method further comprises identifying among the inspection structural elements in the at least one inspection PoI one or more inspection structural elements corresponding to at least one metrology target, to yield one or more target structural elements; identifying design structural elements corresponding to the one or more target structural elements, wherein identifying is provided using design association data specified in the inspection recipe and obtained resulting of associating segmented structural elements comprised in the test PoI with the design structural elements comprised in the design PoI; and enabling metrology measurements for the one or more target structural elements using the identified design structural elements.

In accordance with further aspects of the presently disclosed subject matter, the method can further comprise: prior to identifying design structural elements corresponding to the one or more target structural elements, registering the inspection image in design data coordinates using position calibration data specified in the inspection recipe and obtained resulting of registering the test image in design data coordinates.

Identifying design structural element corresponding to a given target structural element can comprise matching pixels corresponding to the target structural element to corresponding pixels in the test PoI, and using the design association data for identifying design structural element associated with the identified pixels, the identified design structural element being corresponding to the given target structural element.

In accordance with other aspects of the presently disclosed subject matter, there is provided an inspection system capable of inspecting an inspection area of a specimen, the inspection area comprising at least one pattern of interest (PoI). The system comprises an inspection control unit operatively coupled to an inspection tool unit and to a recipe generating unit.

The recipe generating unit is configured: upon obtaining design data informative of design structural elements comprised in a design PoI corresponding to the at least one PoI, to provide global segmentation of a test image captured by the inspection tool unit from the inspection area and comprising at least one test PoI of substantially the same design as the at least one PoI, thereby to obtain segmented structural elements comprised in the test PoI and segmentation configuration data; and to associate the segmented structural elements comprised in the test PoI with the design structural elements comprised in the design PoI, thereby to obtain design association data; and to generate an inspection recipe comprising, at least, segmentation configuration data and design association data;

The inspection control unit is configured: to obtain the design data and the inspection recipe generated by the recipe creating unit; to provide local segmentation of at least one inspection PoI comprised in an inspection image captured from the inspection area by the inspection tool unit, thereby obtaining inspection structural elements comprised in the at least one inspection PoI, wherein the local segmentation is provided using segmentation configuration data specified in the inspection recipe; to identify among the inspection structural elements in the at least one inspection PoI one or more inspection structural elements corresponding to at least one metrology target, to yield one or more target structural elements; to identify design structural elements corresponding to the one or more target structural elements, wherein identifying is provided using design association data specified in the inspection recipe; and to enable metrology measurements for the one or more target structural elements using the identified design structural elements.

In accordance with further aspects of the presently disclosed subject matter, the recipe generating unit can be further configured, to register, prior to associating the segmented structural elements with the design structural elements, the test image in design data coordinates and to obtain position calibration data and to include them in the generated inspection recipe; and the inspection control unit can be further configured, to register, prior to identifying design structural elements corresponding to the one or more target structural elements, the inspection image in design data coordinates using position calibration data comprised in the inspection recipe.

In accordance with further aspects of the presently disclosed subject matter, the recipe generating unit, in order to associate the segmented structural elements with the design structural elements, can be further configured: to assign to each design structural element a unique identifier; to use design data coordinates of the test PoI to identify design structural elements corresponding to segmented structural elements; and, for each of the segmented structural elements, to assign to a given segmented structural element and pixels thereof the same unique identifier as of corresponding design structural element.

In accordance with further aspects of the presently disclosed subject matter, the recipe generating unit can be further configured to generated the inspection recipe comprising metrology data informative of at least one metrology target, and wherein the inspection control unit can be further configured to identify one or more target structural elements in accordance with the metrology data comprised in the inspection recipe.

In accordance with further aspects of the presently disclosed subject matter, the inspection control unit, in order to identify design structural element corresponding to a given target structural element, can be further configured to match pixels corresponding to the target structural element to corresponding pixels in the test PoI, and to use the design association data for identifying design structural element associated with the identified pixels, the identified design structural element being corresponding to the given target structural element.

In accordance with further aspects of the presently disclosed subject matter, the system can further comprise a graphical user interface (GUI) operatively coupled to the recipe generating unit and configured to provide the recipe generating unit with a user-specified input related to defining the inspection PoI. Alternatively or additionally, the (GUI) can be operatively coupled to the inspection control unit and can be configured to provide the inspection control unit with a user-specified input related to defining the at least one metrology target and metrology measurements to be enabled.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "identifying", "specifying", "enabling", "selecting", "generating", "segmenting", "extracting", "registering" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, disclosed in the present application inspection system and/or parts thereof having processing capabilities.

The operations in accordance with the teachings herein can be performed by a computer specially constructed for the desired purposes or by a general purpose computer specially configured for the desired purpose by a computer program stored in a non-transitory computer readable storage medium.

The term "non-transitory" is used herein to exclude transitory, propagating signals, but to otherwise include any volatile or non-volatile computer memory technology suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format or otherwise. Design data comprise design structural elements that represent different features to be formed on one or more layers of a specimen. As known in the contemporary art, a design structural element can be constructed as a geometrical shape with a closed contour or a geometrical shape combined with insertion of other structural elements. By way of non-limiting examples, a given design structural element can comprise one or more STRUCTURE elements inserted by means of SREF, AREF directives in GDSII format, or can comprise one or more CELL elements inserted by means of PLACEMENT and REPETITION (OASIS format).

The references cited in the background teach many principles of a specimen's inspection that are applicable to the present invention. Therefore the full contents of these publications are incorporated by reference herein where appropriate for appropriate teachings of additional or alternative details, features and/or technical background.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

For purpose of illustration only, the following description is provided with respect to inspection of semiconductor wafers. A semiconductor wafer can include one or more layers (e.g. resist, dielectric materials, conductive materials, semiconductive materials, etc.) formed upon a substrate. The presently disclosed subject matter is, likewise, applicable to inspection of other specimens.

Figure 1:
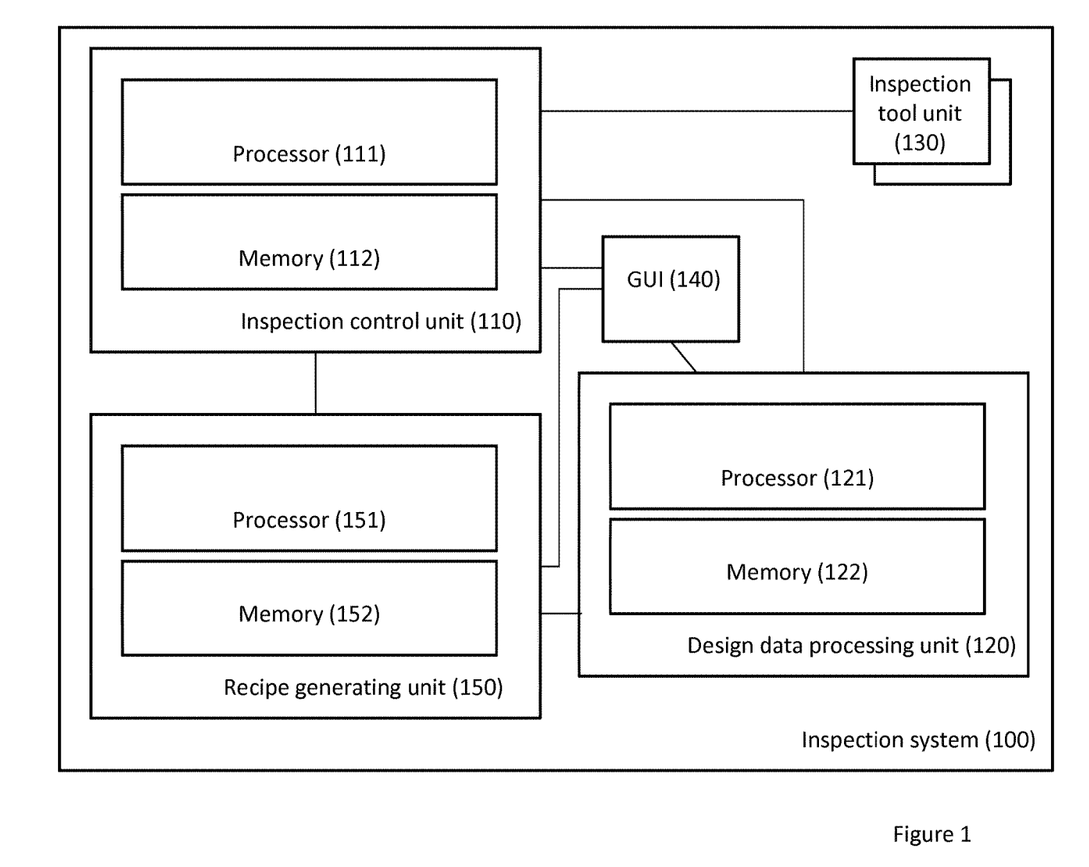
FIG. 1 schematically illustrates a functional block diagram of an inspection system in accordance with certain embodiments of the presently disclosed subject matter.

Bearing this in mind, attention is drawn to FIG. 1, schematically illustrating a functional block diagram of an inspection system in accordance with certain embodiments of the presently disclosed subject matter.

The inspection system 100 illustrated in FIG. 1 can be used for inspection of a specimen (e.g. of a wafer and/or parts thereof) for defects. The inspection system 100 comprises at least one computer-based inspection control unit 110 operatively connected to a computer-based recipe generating unit 150 and one or more inspection tool units 130. The inspection tool units 130 are configured to capture inspection images and/or to review the captured inspection image(s) and/or to enable or provide measurements related to the captured image(s). The inspection system further comprises a computer-based design data processing unit 120 operatively connected to the recipe generating unit 150 and the inspection control unit 110. The inspection control unit 110 is configured to receive from the recipe generating unit 150 an inspection recipe generated by the recipe generating unit 150. The inspection control unit 110 is further configured to manage the one or more inspection tool units 130 and to process the captured images and/or derivatives thereof in accordance with algorithm(s) specified in the inspection recipe. A computer-based graphical user interface (GUI) 140 is operatively connected to the inspection control unit 110, the recipe generating unit 150 and design data processing unit 120, and is configured to enable user-specified inputs related to operating the respective units, as well as to enable rendering the inspection-related results. Operating of the inspection system 100 and units therein will be further detailed with reference to FIGS. 2-4.

It should be noted that the inspection control unit 110, the recipe generating unit 150, graphical user interface (GUI) 140 and design data processing unit 120 can be implemented as stand-alone computer(s) to be used in conjunction with the inspection tool unit(s) 130, as shown in FIG. 1. Alternatively, the respective functions can, at least partly, be integrated with one or more inspection tool units 130. Without limiting the scope of the disclosure in any way, it should also be noted that the inspection tool units 130 can be implemented as inspection machines of various types, such as optical imaging machines, electron beam inspection machines and so on. In some cases the inspection tool units 130 can be configured to inspect an entire wafer or at least an entire die for detection of potential defects (such as, by way of non-limiting example, the Elite and the UVision systems by Applied Materials, Inc., etc.). In other cases, at least one inspection tool unit 130 can be a review tool, which is typically of higher resolution (e.g. a scanning electron microscope (SEM) etc.) and which is used for ascertaining whether a potential defect is indeed a defect. Such a review tool is usually configured to inspect fragments of a die, one at a time, in higher resolution.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software, firmware and hardware.

It is noted that the inspection system 100 can be implemented in a distributed computing environment, in which the aforementioned functional components shown in FIG. 1 or modules thereof can be located in local and/or remote devices, and can be linked through a communication network. In addition, the aforementioned components and modules can, in some cases, be cloud-based.

Figure 2:
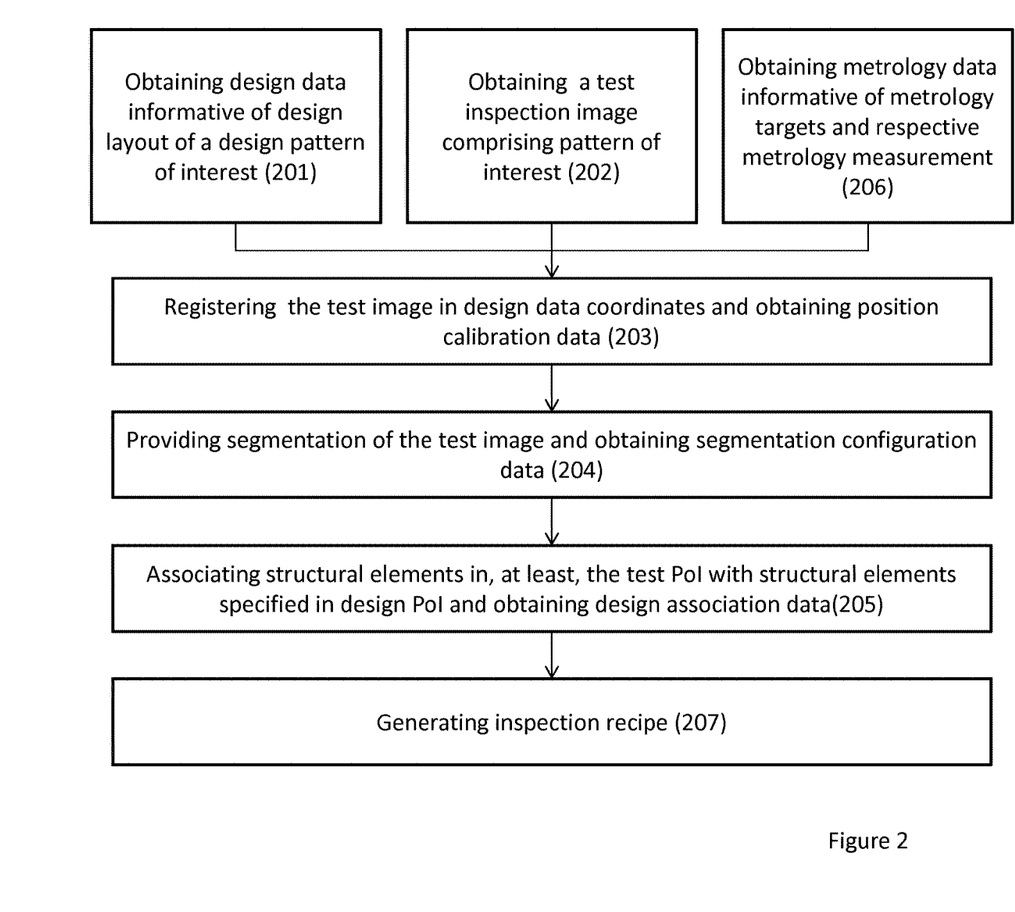
FIG. 2 illustrates a generalized flow chart of generating an inspection recipe in accordance with certain embodiments of the presently disclosed subject matter.

Referring to FIG. 2, there is illustrated a generalized flow chart of generating an inspection recipe in accordance with certain embodiments of the presently disclosed subject matter.

The term "inspection recipe" or "recipe" used in the specification should be expansively construed to cover any settings of parameters specifying operation of the inspection tool(s) (e.g. regions-of-interest to be inspected, their locations, the pixel size, beam current, charging conditions and image acquisition conditions, defect detection algorithm, image processing parameters, and/or others). An inspection recipe can be initially generated off-line by the recipe generating unit 150 and further adjusted to a given inspection tool and/or process. The inspection recipe can be generated using user-specified inputs and/or be further amended and/or completed using user-specified inputs.

The inspection control unit 110 receives the inspection recipe (e.g. from the recipe generating unit 150, external database, etc.) and provide instructions to the inspection tool(s) 130 accordingly.

The recipe generating unit 150 receives (201) design data informative of a hotspot or other repetitive pattern to be inspected (referred to hereinafter as a pattern of interest) and design structural elements therein. By way of non-limiting example, the recipe generating unit 150 can receive from the design data processing unit 120 (or from a user via GUI 140) a CAD clip informative of design layout of one or more different (i.e. with different design) patterns of interest (referred to hereinafter as design patterns of interest) comprised in an area of wafer to be inspected (referred to hereinafter as an inspection area). It is noted that an inspection area can be specified with no relation to a particular die or wafer. Typically, a size of inspection area is substantially larger than a size of a pattern of interest, and inspection area can correspond to an entire die or to a fragment of a die (e.g. a fragment selected for reviewing and/or measuring).

For purpose of illustration only, the following description is provided with respect to CAD clips. Embodiments are, likewise, applicable to other formats and representations of design data informative of one or more patterns of interest. In some embodiments (e.g. if design data are presented in vector format), intermediate processing of design data can be required prior to registration operation 203.

By way of non-limiting example, one or more different patterns of interest can be selected by a user among predefined patterns of interest, designated by a user based on design data analyses (e.g. analyses provided by design data processing unit 120) or otherwise specified by user. Optionally, a user can specify a pattern of interest via GUI 140. By way of another non-limiting example, the pattern of interest (PoI) can be specified by design data processing unit 120 resulting from an appropriate analysis of design data (e.g. a hotspot revealed by a processor 121 resulting of processing design data stored in the memory 122).

Thus, upon specifying the PoI, the recipe generating unit receives design data informative of design structural elements comprised in a design PoI corresponding to the specified PoI (i.e. having substantially the same design and belonging to the same layer(s) as the specified PoI). In some embodiments, PoI can represent structural elements corresponding to one or more design layers. The recipe generation unit can be configured to receive, respectively, one or more CAD clips, each of a single layer, and to specify the respective design PoI, design elements and layers thereof.

The recipe generating unit 150 also receives (202) a test image captured from the inspection area by an inspection tool unit 130, the test image comprising a plurality of patterns of interest (referred to hereinafter also as test PoI) of the same design as the specified PoI. Preferably, the test image is captured under the same conditions (resolution, illumination, etc.) as further captured inspection images. Optionally, the test image can be any previously captured inspection image selected to be used for recipe generation.

For purpose of illustration only and unless specifically stated otherwise, the following description is provided with respect to inspection area comprising a plurality of patterns of interest of substantially the same design and with respect to CAD clip informative of at least the pattern of interest of the same design.

Presently disclosed subject matter is, likewise, applicable to inspection area comprising several pluralities of the patterns of interest, each plurality comprising patterns of interest of substantially the same design. Embodiments can be implemented with a single CAD clip informative of all appropriate patterns of interest of different design, or with several CAD clips each comprising at least one pattern of interest with respective design. It is noted that, unless specifically stated otherwise, patterns with transformable design are considered in this specification as same pattern.

The recipe generating unit registers (203) the test image with regard to the CAD clip thereby obtaining for the patterns of interest comprised in the test image their coordinates in design space (coordinates in design space are referred to hereinafter as design coordinates). Some differences between the PoIs coordinates in the test image and the corresponding locations in design data coordinates are likely to occur for various reasons—scanning conditions (e.g. illumination) as well as imperfections, shifts and outright errors in the scanning process, errors in the manufacturing of the electric circuit printed on the wafer, and so forth. The recipe generating unit further generates position calibration data (203) data. The recipe generating unit can provide registration and generate position calibration data by any suitable method of registration known in the art (e.g. as described in US2007/0280527, US2013/204569 or other relevant references cited in the background).

The position calibration data are informative of registration algorithm(s) and parametric configuration(s) thereof. Position calibration data can be informative of a global (e.g. average) offset between the test image and design data and/or of multiple offsets, each related to a specific PoI or a group thereof within the plurality of PoIs comprised in an inspection area. Optionally, the position calibration data can comprise a data structure specifying respective offsets for each pattern of interest (or groups thereof) within the plurality of PoIs. The position calibration data can be generated by the processor 151 and stored in the memory 152.

By way of non-limiting example, the following Table 1 illustrates a data structure comprised in the generated position calibration data and informative of offsets for different hotspots of the same type and design. The hotspot ID field stores unique identifiers associated with each of the hotspots. In the provided example, the unit digit represents a column, and the tenths digit represents a row identifying respective hotspot in the test image. The $X_{start}$ and the $Y_{start}$ fields indicate the position of respective hotspots (e.g. the locations of the top-left corners thereof). The units used for position may be those of the design data (e.g. CAD data)—such as micrometers (μm)—and may be those of the scanned image—e.g. pixels. The Xdisp and the Ydisp fields indicate displacement of the hotspots in relation to design data. The units used for displacement may be those of the design data (e.g. CAD data)—such as micrometers (μm)—and may be those of the scanned image—e.g. pixels. Other representations of the displacement may also be used (e.g. size and direction of displacement, (R,θ)).

TABLE 1

| hotspot ID | Xstart | Ystart | Xdisp | Ydisp |
| --- | --- | --- | --- | --- |
| hotspot 1.1 | 0 | 0 | 3 | −12.1 |
| hotspot 1.2 | 0 | 40 | 3.2 | −12.4 |
| hotspot 1.3 | 0 | 80 | 2.9 | −13.1 |
| hotspot 1.4 | 0 | 120 | 3 | −12.5 |
| hotspot 1.5 | 0 | 160 | 3.4 | −12.3 |
| hotspot 1.6 | 0 | 200 | 3.9 | −10.1 |
| hotspot 1.7 | 0 | 240 | 3.2 | −11.8 |
| hotspot 1.8 | 0 | 280 | 3 | −12.1 |
| hotspot 1.9 | 0 | 320 | 2.8 | −12.6 |
| hotspot 2.1 | 120 | 0 | 3.1 | −12.2 |
| hotspot 2.2 | 120 | 40 | 3.2 | −12.3 |
| hotspot 2.3 | 120 | 80 | 3.1 | −12.6 |
| hotspot 2.4 | 120 | 120 | 3 | −12.7 |
| hotspot 2.5 | 120 | 160 | 3.2 | −12.4 |
| hotspot 2.6 | 120 | 200 | 3.6 | −11.1 |
| hotspot 2.7 | 120 | 240 | 3.4 | −11.5 |
| hotspot 2.8 | 120 | 280 | 3.3 | −12 |
| hotspot 2.9 | 120 | 320 | 3 | −12.1 |
| hotspot 3.1 | 240 | 0 | 3.3 | −12.4 |
| hotspot 3.2 | 240 | 40 | 3.2 | −12.3 |
| hotspot 3.3 | 240 | 80 | 3.2 | −12.5 |
| hotspot 3.4 | 240 | 120 | 3.1 | −12.6 |
| hotspot 3.5 | 240 | 160 | 3.1 | −12.1 |
| hotspot 3.6 | 240 | 200 | 3.4 | −11.5 |
| hotspot 3.7 | 240 | 240 | 3.5 | −11.2 |
| hotspot 3.8 | 240 | 280 | 3.5 | −11.8 |
| hotspot 3.9 | 240 | 320 | 3.2 | −11.9 |

The recipe generating unit 150 further segments (204) the test image into groups of pixels belonging to the same object, thereby identifying continuous regions corresponding to different structural elements. Segmentation is provided to the image corresponding to the entire inspection area and is referred to hereinafter as a global segmentation. The global segmentation is provided considering, among other parameters, one or more global characteristics (e.g. global noise statistics) of the segmented area. Upon successful verification and validation of segmentation results with respect to one or more similarity and/or discontinuity criteria known in the art, the recipe generating unit 150 generates (204) segmentation configuration data informative of segmentation algorithm(s) and parametric configuration(s) thereof. Segmentation configuration data can comprise customized segmentation algorithms and parameters thereof for different areas in the test image, or can comprise a segmentation algorithm and parameters thereof common for all areas. By way of non-limiting example, the segmentation parameters can be global or local thresholds related to histogram-based, edge-based, boundary-based, watershed and/or other segmentation algorithms. Once defined and validated globally, the segmentation configuration data are valid also for local segmentation purposes.

In some embodiments, the test PoI can represent structural elements corresponding to one or more design layers. The recipe generation unit can be configured to use the obtained design coordinates of the test PoI and the respective design PoI specifying design structural elements and layers thereof to identify, among the structural elements revealed by the segmentation, structural elements corresponding to different design layers. In a case of overlapping of such structural elements, the recipe generation unit can be configured to re-segment the test image considering design layers of structural elements revealed by initial segmentation.

Structural elements revealed by the segmentation (referred to hereinafter as segmented structural elements) and segmentation configuration data can be stored in a memory 152.

The recipe generation unit further associates (205) the segmented structural elements in at least one pattern of interest in the test image (referred to hereinafter as a test PoI) with structural elements of corresponding design PoI in a CAD clip (such elements are referred to hereinafter as design structural elements) and generates design association data informative of design structural elements corresponding to each of the pixels in the at least one test PoI.

Figure 3:
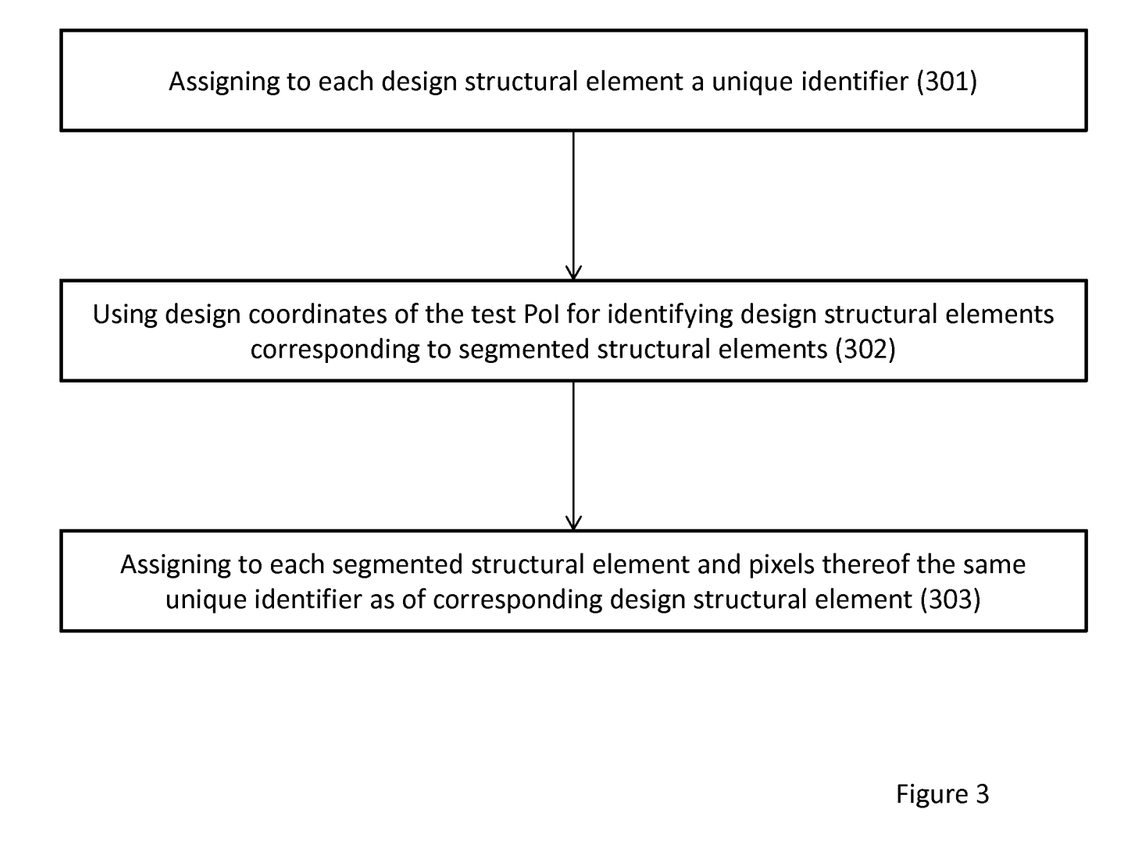
FIG. 3 illustrates a generalized flow chart of associating the segmented structural elements in at least one test PoI with structural elements of corresponding design PoI in accordance with certain embodiments of the presently disclosed subject matter.

Associating the segmented structural elements in at least one test PoI with structural elements of corresponding design PoI is illustrated in FIG. 3. Associating can comprise assigning to each design structural element a unique identifier (301), using design coordinates of the test PoI for identifying design structural elements corresponding to segmented structural elements (302), and assigning to each segmented structural element and pixels thereof the same unique identifier as of corresponding design structural element (303). The rest of the pixels (i.e. pixels do not presenting any parts of the segmented structural elements) in the test PoI can be denominated as a space between structural elements. Design association data can comprise an association data structure associating each pixel in the test pattern of interest with ID of a respectively associated design structural element or with space therebetween.

As all PoIs in the plurality of PoIs have the same design, the recipe generation unit can use position calibration data and design association data obtained for one test PoI to associate segmented structural elements in any and/or all PoIs in the test image with design structural elements. Accordingly, the association data structure can associate each pixel in any and/or all PoIs in the test image with ID of respectively associated design structural element in the design PoI or with space therebetween.

When the test PoI represents structural elements corresponding to one or more design layers, associating further comprises considering layers of the design structural elements and respective layers corresponding to segmented structural elements.

Referring back to FIG. 2, the recipe generation unit also obtains (206) metrology data informative of one or more metrology targets defined in the test pattern of interest and constituted by one or more structural elements and/or groups thereof. Metrology data are further informative of metrology measurements specified with regard to the defined metrology targets. By way of non-limiting example, the metrology target(s) and measurement(s) thereof can be specified by user via GUI 140. Alternatively or additionally, the metrology target(s) and measurement(s) thereof can be specified by design data processing unit 120 resulting from an appropriate analysis of design data. Optionally, a user can specify the metrology target(s), while corresponding measurements can be, in response, specified by the design data processing unit 120; selected, in accordance with predefined rules, by the recipe generation unit among predefined measurements associated to different metrology targets or otherwise automatically specified. Metrology targets can be specified in design coordinates. Alternatively, metrology targets can be specified as polygons characterized by shape, size and, optionally, relative position within the design or test pattern of interest. In such cases, the recipe generation unit can be configured to calculate respective design coordinates to the specified metrology targets.

The terms "metrology measurement" or "measurement" used in this specification should be expansively construed to cover any metrology measurement procedure used to extract information from structural elements and/or groups thereof defined as metrology targets. By way of non-limiting example, measurement information to be extracted can be indicative of errors related to dimensions (line widths, line spacing, size of the element, edge roughness, gray level statistics, etc.) and/or shape of metrology targets, errors in distances between structural elements within metrology targets or between metrology targets, overlay errors associated with structure elements corresponding to different design levels, etc. The measurements can include structure-based measurements, rule-based measurements, measurements based on templates, measurements associated with geometric distances, centers of gravity and/or other measurements. The metrology measurement procedure can also specify coordinates of one or more PoIs to be measured in the inspection image and a measuring order thereof.

The recipe generation unit further generates (207) the inspection recipe comprising instructions related to registering and segmenting images, associating image structural elements with design structural elements and metrology measurement of specified metrology targets. The recipe is further informative of the obtained position calibration data, segmentation configuration data, data informative of associating between design structural elements and image structural elements and data informative of metrology targets and respective metrology measurement. It is noted that the recipe can comprise the respective data structures or can comprise one or more pointers to storing location(s) of the required data.

Optionally, the test image can be captured under conditions other than an inspection image. The generated recipe can further comprise parameters for adjusting recipe parameters depending on the imaging conditions of an inspection image in relation to the test image and/or the particular layer being inspected.

Inspection recipe can be generated as a single recipe file generated after registering (203), segmenting (204), associating (205) and obtaining data informative of metrology targets and respective metrology measurement (206). Alternatively, inspection recipe can include several recipe files each of them generated after one or more operations above. By way of non-limiting example, inspection recipe can include a design association recipe file generated after operations (203)-(205) are provided on the test image and metrology recipe file is generated based on user-specified input received before or during run time. The inspection recipe can further comprise pointers for location(s) of data informative of segmented test structural elements, IDs assigned to design structural elements, etc.

The generated recipe can be exported to the inspection control unit(s) and/or other devices (e.g. comprising external database). The generated recipe can be updated during runtime responsive to user-specified definition of metrology targets or other user-specified inputs related to the recipe.

Operations (203)-(206) by the recipe generating unit 150 are provided by a processor 151 operatively coupled to the memory 152 storing the respectively generated data.

Figure 4:
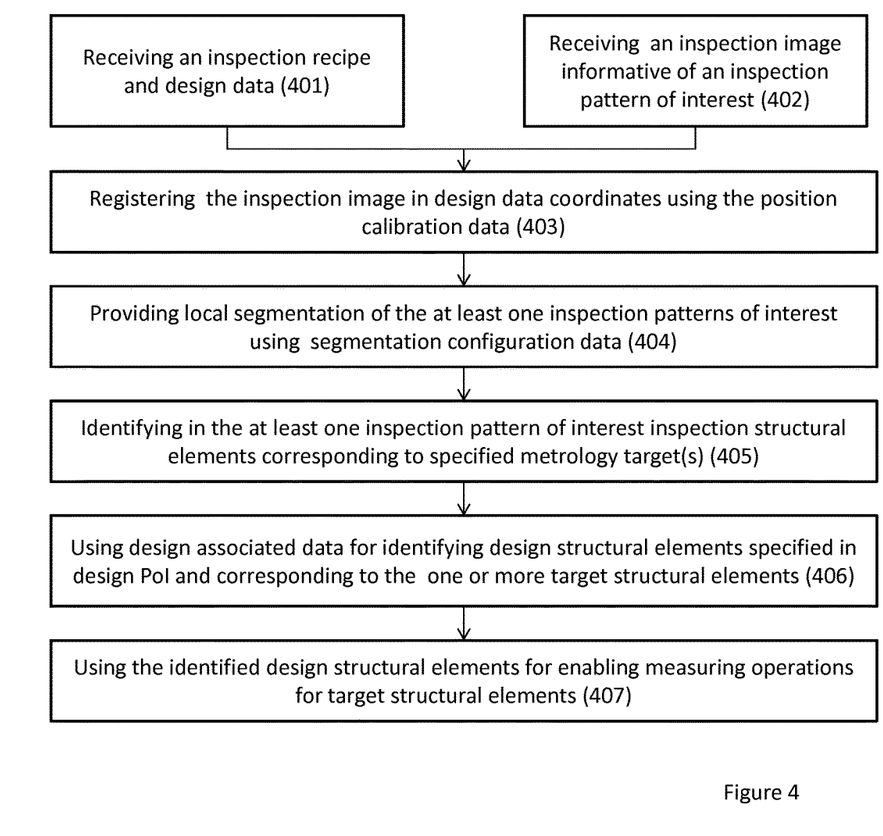
FIG. 4 illustrates a generalized flow chart of the runtime inspection process in accordance with certain embodiments of the presently disclosed subject matter.

Referring to FIG. 4, there is illustrated a generalized flow chart of inspecting a specimen in accordance with certain embodiments of the presently disclosed subject matter.

The inspection control unit 110 receives (401) an inspection recipe generated using the test image and the respective design data. The received recipe comprises instructions related, at least, to registering and segmenting inspection images as well as to associating structural elements in the inspection image with design structural elements. The inspection recipe is further informative of the obtained position calibration data, segmentation configuration data, and design association data. The recipe can also comprise metrology data informative of specified metrology targets, metrology measurement and/or related instructions. Alternatively or additionally, the metrology data or part thereof can be specified by a user before, during or after capturing the inspection image, and received by the inspection control unit via GUI 140. The inspection recipe can be generated as detailed above with reference to FIGS. 2-3 and can be imported from the recipe generating unit 150 or, optionally, from an external database.

Optionally, the received inspection recipe can further comprise parameters for adjusting recipe parameters depending on the imaging conditions of the inspection image in relation to conditions of capturing the test image.

The inspection control unit 110 also receives (402) at least one inspection image captured by the inspection tool by collecting signals arriving from the inspection area of the specimen. The inspection image comprises at least one pattern of interest to be inspected (referred to hereinafter as inspection PoI) and having the same design as the test PoI used for recipe generation.

The inspection control unit 110 further runs the received inspection recipe and processes the received inspection image(s) in accordance with recipe instructions.

The inspection control unit uses the design data and the position calibration data comprised in the recipe for registering (403) at least one inspection image for obtaining coordinates of inspection PoIs in design space. In case of position calibration data comprising multiple offsets corresponding to different test PoIs, the inspection control unit obtains design coordinates of a given inspection PoI by using offset of corresponding test PoI.

The inspection control unit 110 further uses segmentation configuration data specified in the recipe for locally segmenting (404) one or more patterns of interest in the inspection image into inspection structural elements. Segmentation can be provided separately for each of the inspection PoIs or groups thereof. The local segmentation can be provided using segmentation configuration data obtained by global segmentation during recipe creation, with no need for segmenting the entire inspection area in the inspection image, for considering global characteristics of the entire inspection area and/or further verification and validation of segmentation results.

If the pattern of interest in the inspection image represents structural elements corresponding to one or more design layers, local segmentation is provided considering design layers of structural elements as revealed by the global segmentation of the test image.

The inspection control unit 110 further identifies (405) among the inspection structural elements in the at least one inspection PoI one or more structural elements specified as metrology targets. If metrology targets are specified in design coordinates, the inspection control unit can use position calibration data to identify in the inspection PoI inspection structural elements with corresponding coordinates. Optionally, the inspection control unit can receive data informative of the metrology target as specified by a user via GUI 140. If the metrology target is specified as a polygon (or a set of polygons) characterized by shape, size and, optionally, relative position within the pattern of interest, the inspection control unit can recognize the corresponding polygon in the inspection PoI and calculate respective design coordinates thereof using position calibration data.

The inspection control unit further uses design associated data for identifying (406) design structural elements specified in design PoI and corresponding to the one or more specified as metrology targets inspection structural elements. By way of non-limiting example, identifying such design structural elements can comprise matching pixels corresponding to inspection structural elements specified as metrology targets to corresponding pixels in the test PoI, and using the association data structure for identifying IDs of design structural elements associated with respectively identified pixels, such IDs specifying the design structural elements corresponding to the one or more inspection structural elements specified as metrology targets.

Optionally, the inspection control unit can associate, in a similar manner, all inspection structural elements in the inspection PoI with design structural elements prior to identifying inspection structural elements specified as metrology, and can further identify the respective design structural elements using data informative of this prior association.

The identified structural elements specified in design data can be further used for enabling (407) measuring operations for metrology targets in the inspection PoI in accordance with specified metrology measurements. By way of non-limiting example, measuring operation can comprise comparing an inspection structural element specified as metrology target with corresponding design element and extracting measurement information indicative of errors related to dimensions and/or shape of this structural element. By way of another non-limiting example, measuring operation can comprise comparing a group of inspection structural elements specified as metrology target with corresponding design elements and extracting measurement information indicative of errors in distances between the inspection structural elements in the group and/or overlay errors associated therewith.

Sequence of operations (403)-(407) can be provided separately for each inspection PoI or a group thereof. Alternatively, depending on configuration specified in inspection recipe, each of operations (403)-(406) can be provided for all PoIs in the inspection area, while the measuring operations can be provided separately for each inspection PoI or a group thereof in accordance with an order specified by a metrology measurement procedure.

Operations (403)-(406) by inspection control unit 110 are provided by a processor 111 operatively coupled to the memory 112 storing the appropriate data. Optionally, at least part of data necessary for operations (403)-(406) can be stored in the memory 152 configured as accessible to the processor 111.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method of inspecting an inspection area of a specimen, the inspection area comprising at least one inspection pattern of interest (PoI), the method comprising:
    obtaining design data informative of design structural elements in a design PoI corresponding to the PoI and an inspection recipe generated using the design data and a test image comprising at least one test PoI of substantially the same design as the at least one PoI, the inspection recipe specifying an offset between the design data and the test image and a parameter that is based on an imaging condition associated with the inspection area of the specimen and another imaging condition associated with the test image;
    providing, by a processor, local segmentation of at least one inspection PoI in an inspection image captured from the inspection area to obtain inspection structural elements in the at least one inspection PoI by using segmentation configuration data specified in the inspection recipe and obtained from global segmentation of the test image captured from the inspection area;
    identifying, among the inspection structural elements in the at least one inspection PoI, one or more inspection structural elements corresponding to at least one metrology target to yield one or more target structural elements;
    identifying design structural elements corresponding to the one or more target structural elements by using design association data specified in the inspection recipe and obtained from associating segmented structural elements in the test PoI with the design structural elements in the design PoI; and
    enabling metrology measurements for the one or more target structural elements using the identified design structural elements and the parameter from the inspection recipe.

2. The method of claim 1 further comprising:
    prior to identifying design structural elements corresponding to the one or more target structural elements, registering the inspection image in design data coordinates using position calibration data specified in the inspection recipe and obtained from registering the test image in design data coordinates.

3. The method of claim 1, wherein identifying design structural element corresponding to a given target structural element comprises matching pixels corresponding to the target structural element to corresponding pixels in the test PoI, and using the design association data for identifying design structural element associated with the identified pixels, the identified design structural element corresponding to the given target structural element.

4. The method of claim 1, wherein at least one metrology measurement is selected from at least one of:
    extracting measurement information indicative of discrepancy related to dimensions and/or shape of a target structural element in comparison to corresponding design structural element identified using the design association data;
    extracting measurement information indicative of discrepancy in distances between target structural elements in comparison to corresponding design structural elements identified using the design association data; or
    extracting measurement information indicative of overlay discrepancy associated with target structural elements in comparison to corresponding design structural elements identified using the design association data.

5. A system to inspect an inspection area of a specimen, the inspection area comprising at least one pattern of interest (PoI), the system comprising an inspection tool unit operatively coupled to a computerized inspection control unit configured to:
    obtain the design data and a test image;
    receive an inspection recipe that specifies an offset between the design data and the test image and a parameter that is based on an imaging condition associated with the inspection area of the specimen and another imaging condition associated with the test image;
    provide local segmentation of at least one inspection PoI in an inspection image captured from the inspection area by the inspection tool unit to obtain inspection structural elements in the at least one inspection PoI by using segmentation configuration data specified in the inspection recipe;
    identify, among the inspection structural elements in the at least one inspection PoI, one or more inspection structural elements corresponding to at least one metrology target to yield one or more target structural elements;
    identify design structural elements corresponding to the one or more target structural elements by using design association data specified in the inspection recipe; and
    enable metrology measurements for the one or more target structural elements using the identified design structural elements and the parameter from the inspection recipe.

6. The system of claim 5 further comprising a recipe generating unit operatively coupled to the inspection control unit, wherein the recipe generating unit is configured to:
    upon obtaining the design data informative of design structural elements in a design PoI corresponding to the at least one PoI, provide global segmentation of the test image captured by the inspection tool unit from the inspection area and comprising at least one test PoI of substantially the same design as the at least one PoI to obtain segmented structural elements in the test PoI and segmentation configuration data;
    associate the segmented structural elements in the test PoI with the design structural elements in the design PoI to obtain design association data; and
    generate an inspection recipe comprising segmentation configuration data and design association data.

7. The system of claim 6 wherein:
    the recipe generating unit is further configured to register, prior to associating the segmented structural elements with the design structural elements, the test image in design data coordinates and to obtain position calibration data and to include the position calibration data in the generated inspection recipe, and
    the inspection control unit is further configured to register, prior to identifying design structural elements corresponding to the one or more target structural elements, the inspection image in design data coordinates using position calibration data in the inspection recipe.

8. The system of claim 5, wherein the design association data comprise an association data structure associating, for each of the segmented structural elements, each of the pixels corresponding to a given segmented structural element in the test PoI with unique identifier of a design structural element associated with the given segmented structural element.

9. The system of claim 5, wherein the computerized inspection control unit is further configured to select at least one metrology measurement from at least one of:
- extracting measurement information indicative of discrepancy related to dimensions and/or shape of an inspection structural element in comparison to corresponding design structural element identified using the design association data;
- extracting measurement information indicative of discrepancy in distances between inspection structural elements in comparison to corresponding design structural elements identified using the design association data; or
- extracting measurement information indicative of overlay discrepancy associated with inspection structural elements in comparison to corresponding design structural elements identified using the design association data.

10. The system of claim 5 wherein the inspection control unit, in order to identify design structural element corresponding to a given target structural element, is further configured to match pixels corresponding to the target structural element to corresponding pixels in the test PoI, and to use the design association data for identifying design structural element associated with the identified pixels, the identified design structural element corresponding to the given target structural element.

11. The system of claim 5 further comprising a graphical user interface (GUI) operatively coupled to the recipe generating unit and configured to provide the recipe generating unit with a user-specified input related to defining the inspection PoI.

12. The system of claim 5 further comprising a graphical user interface (GUI) operatively coupled to the inspection control unit and configured to provide the inspection control unit with a user-specified input related to defining the at least one metrology target and metrology measurements to be enabled.

13. A non-transitory computer usable medium comprising instructions which, when executed by a processor, cause the processor to perform operations associated with inspecting an inspection area of a specimen, the inspection area comprising at least one inspection pattern of interest (PoI), the operations comprising:
- obtaining design data informative of design structural elements in a design PoI corresponding to the PoI and an inspection recipe generated using the design data and a test image comprising at least one test PoI of substantially the same design as the at least one PoI, the inspection recipe specifying an offset between the design data and the test image and a parameter that is based on an imaging condition associated with the inspection area of the specimen and another imaging condition associated with the test image;
- providing local segmentation of at least one inspection PoI in an inspection image captured from the inspection area to obtain inspection structural elements in the at least one inspection PoI by using segmentation configuration data specified in the inspection recipe and obtained from global segmentation of the test image captured from the inspection area;
- identifying, among the inspection structural elements in the at least one inspection PoI, one or more inspection structural elements corresponding to at least one metrology target to yield one or more target structural elements;
- identifying design structural elements corresponding to the one or more target structural elements by using design association data specified in the inspection recipe and obtained from associating segmented structural elements in the test PoI with the design structural elements in the design PoI; and
- enabling metrology measurements for the one or more target structural elements using the identified design structural elements and the parameter from the inspection recipe.

14. The non-transitory computer usable medium of claim 13, the operations further comprising:
- prior to identifying design structural elements corresponding to the one or more target structural elements, registering the inspection image in design data coordinates using position calibration data specified in the inspection recipe and obtained from registering the test image in design data coordinates.

15. The non-transitory computer usable medium of claim 13, wherein identifying design structural element corresponding to a given target structural element comprises matching pixels corresponding to the target structural element to corresponding pixels in the test PoI, and using the design association data for identifying design structural element associated with the identified pixels, the identified design structural element corresponding to the given target structural element.

16. The non-transitory computer usable medium of claim 13, wherein at least one metrology measurement is selected from at least one of:
- extracting measurement information indicative of discrepancy related to dimensions and/or shape of a target structural element in comparison to corresponding design structural element identified using the design association data;
- extracting measurement information indicative of discrepancy in distances between target structural elements in comparison to corresponding design structural elements identified using the design association data; or
- extracting measurement information indicative of overlay discrepancy associated with target structural elements in comparison to corresponding design structural elements identified using the design association data.

* * * * *